United States Patent
Yang et al.

(10) Patent No.: US 9,325,255 B2
(45) Date of Patent: Apr. 26, 2016

(54) SWITCH CONTROLLER, SWITCH CONTROL METHOD, AND POWER SUPPLY DEVICE COMPRISING THE SWITCH CONTROLLER

(71) Applicants: Seung-Uk Yang, Anyang-si (KR); In-Ki Park, Anyang-si (KR); Gye-Hyun Cho, Incheon-si (KR); Hyun-Chul Eom, Seoul (KR)

(72) Inventors: Seung-Uk Yang, Anyang-si (KR); In-Ki Park, Anyang-si (KR); Gye-Hyun Cho, Incheon-si (KR); Hyun-Chul Eom, Seoul (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 505 days.

(21) Appl. No.: 13/744,886

(22) Filed: Jan. 18, 2013

(65) Prior Publication Data

US 2013/0215655 A1     Aug. 22, 2013

(30) Foreign Application Priority Data

Feb. 17, 2012   (KR) .................. 10-2012-0016590

(51) Int. Cl.
  *H02M 7/04*      (2006.01)
  *H02M 7/217*     (2006.01)
  *H05B 33/08*     (2006.01)

(52) U.S. Cl.
  CPC .......... *H02M 7/217* (2013.01); *H05B 33/0824* (2013.01); *H05B 33/0851* (2013.01)

(58) Field of Classification Search
  CPC ... H02M 7/217; H02M 7/2176; H02M 1/082; H02M 1/083; H02M 2001/0012; H02M 3/157; H05B 33/0815
  See application file for complete search history.

(56) References Cited

U.S. PATENT DOCUMENTS

| | | | |
|---|---|---|---|
| 2009/0195168 A1* | 8/2009 | Greenfeld ...................... | 315/192 |
| 2011/0199010 A1* | 8/2011 | Cho et al. ...................... | 315/186 |
| 2014/0077718 A1* | 3/2014 | Zotter ................ | H05B 33/0815 315/224 |
| 2015/0271894 A1* | 9/2015 | Torre ..................... | H05B 37/02 315/291 |

OTHER PUBLICATIONS

BENCHMarks—New Product, Tips and Tools for Power and Mobile Applications, 2012, vol. 1, 8 sheets, FAN3850x series, Fairchild Semiconductor.

* cited by examiner

*Primary Examiner* — Matthew Nguyen
(74) *Attorney, Agent, or Firm* — Okamoto & Benedicto LLP (57) ABSTRACT

An exemplary embodiment of the present invention relates to a switch controller, a method for controlling a switch, and a power supply including the switch controller. According to the exemplary embodiment of the present invention, an AC input passed through a dimmer is rectified such that an input voltage is generated, and the input voltage is transmitted to the power switch. A charging current is generated using a voltage that depends on the input voltage, a zero cross-point at which the input voltage becomes zero voltage is detected using a detection voltage output from a current source, and a reference signal synchronized at the detected zero cross-point is generated.

20 Claims, 4 Drawing Sheets

SWITCH CONTROLLER, SWITCH CONTROL METHOD, AND POWER SUPPLY DEVICE COMPRISING THE SWITCH CONTROLLER

CROSS-REFERENCE TO RELATED APPLICATION

This application claims priority to and the benefit of Korean Patent Application No. 10-2012-0016590 filed in the Korean Intellectual Property Office on Feb. 17, 2012, the entire contents of which are incorporated herein by reference.

BACKGROUND OF THE INVENTION (a) Field of the Invention

The present invention relates to a switch controller, switch control method, and a power supply including a switch controller.

(b) Description of the Related Art

A converter may control switching operation of a power switch according to an input voltage generated by full-wave rectifying an AC input.

The converter generates an internal reference signal that depends on the input voltage, and controls the switching operation of the power switch by comparing the internal reference signal with a current flowing in the power switch. In further detail, the internal reference signal has a phase synchronized by the input voltage.

However, a triac dimmer may be used to control the amount of AC input supplied to a load. The triac dimmer passes only a part of the AC input according to a predetermined dimmer angle. The dimmer angle indicates a phase of an AC input passing through a dimmer.

Figure 1:
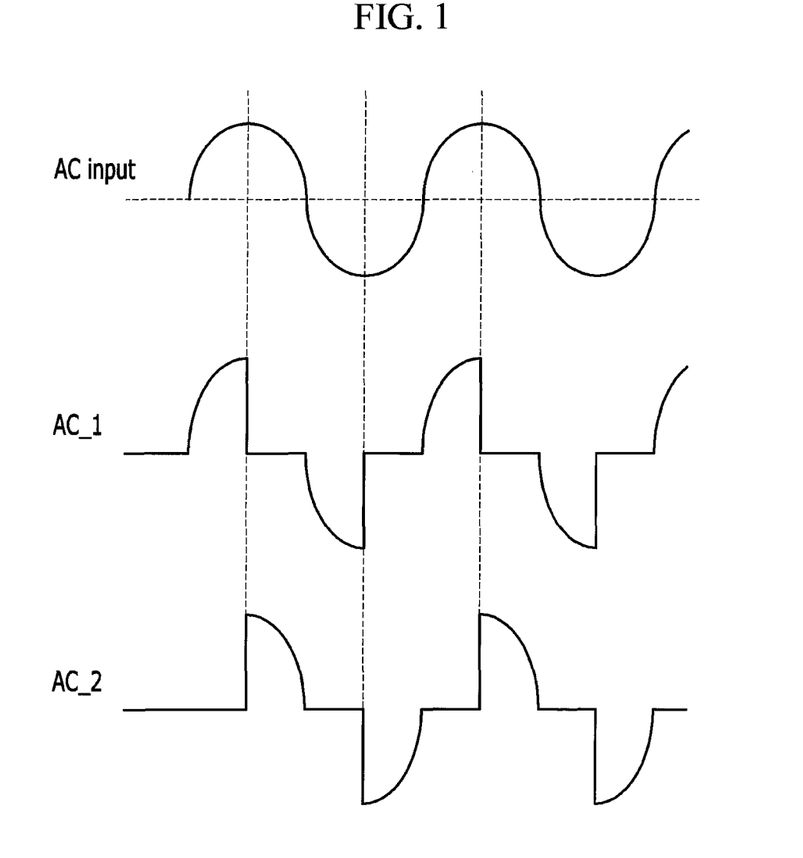
FIG. 1 shows a result of an AC input passed through a triac dimmer according to a dimmer angle.

FIG. 1 shows a result of an AC input passed through a triac dimmer according to a dimmer angle. FIG. 1 exemplarily illustrates a case that the triac dimmer angle is included in a range from 0 to 90 degrees and a case that the triac dimmer angle is included in a range from 90 to 180 degrees.

As shown in FIG. 1, when the triac dimmer angle is included in the range from 0 to 90 degrees, a phase between 0 to 90 degrees and a phase between 180 to 270 degrees among one cycle of the AC input may pass the dimmer as shown in AC_1.

Unlikely, when the triac dimmer angle is included in the range from 90 degrees to 180 degrees, a phase of 90 to 180 degrees and a phase of 270 to 360 degrees among one cycle of the AC input may pass the dimmer as shown in AC_2.

However, when an internal reference signal is generated using an input voltage that is full-wave rectified from the AC input passed through the triac dimmer as shown in AC_1 and AC_2, the input voltage and the internal reference signal may not be synchronized.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a reference signal synchronized with an input voltage.

An exemplary embodiment of the present invention relates to an apparatus for controlling switching operation of a power switch to which an input voltage rectified from an AC input passed through a dimmer, is transmitted. The switch controller includes a current source generating a charging current using a voltage that depends on the input voltage and a reference signal generator detecting a zero cross-point at which the input voltage becomes zero voltage using a detection voltage output from the current source and generating a reference signal synchronized at the detected zero cross-point.

An input terminal voltage of the power switch depends on the input voltage, and the current source generates a charging current that depends on the input terminal voltage of the power switch.

The current source includes a JFET, and the detection voltage is a voltage that is the input terminal voltage of the power switch, passed through the JFET.

The reference signal generator includes: a zero cross detection circuit receiving the detection voltage and sensing a time point that the detection voltage reaches zero voltage; a digital sine wave generator generating a reference clock signal controlling an increase or decrease time point of the reference signal during one cycle of the input voltage, determined according to the sensed zero voltage reach time point and generating a digital signal increased and then decreased according to the reference clock signal during the one cycle; and a digital-to-analog converter generating the reference signal by converting the digital signal to an analog signal.

The reference clock signal includes a predetermined number of edges during the one cycle, and the digital sine wave generator increases the digital signal by being synchronized at a time point that the reference clock signal edge is generated during a period from a time point that the first edge of the reference clock signal is generated to the n-th edge of the reference clock signal among the one cycle, and decreases the digital signal by being synchronized at a time point that the reference clock signal edge is generated during a period from the (n+1)th edge to the predetermined number of edge.

The zero cross detection circuit generates a zero voltage detection signal having a first level when the detection voltage is higher than zero voltage and a second level when the detection voltage is lower than zero voltage.

The digital sine wave generator senses a rising edge or a falling edge of the zero voltage detection signal as the zero cross-point, and determines a period between two adjacent rising edges or two adjacent falling edges as one cycle of the input voltage.

The switch controller further includes a PWM controller controlling switching operation of the power switch by comparing a current flowing in the power switch and the reference signal.

In addition, an exemplary embodiment of the present invention relates to a switch control method for controlling switching operation of a power switch to which an input voltage rectified from an AC input passed through a dimmer, is transmitted.

The switch control method includes: generating a charging current using a voltage that depends on the input voltage; generating a voltage that depends on the input voltage as a detection voltage according to the generation of the charging current; detecting a zero cross-point at which the input voltage becomes zero voltage using the detection voltage; and generating a reference signal that is synchronized at the detected zero cross-point.

The voltage that depends on the input voltage is an input terminal voltage of the power switch, and the generating of the charging current includes generating a charging current that depends on the input terminal voltage of the power switch.

The generating of the voltage that depends on the input voltage as the detection voltage according to the generating of the charging current voltage includes a step that the voltage that depends on the input voltage passes through a JFET for generation of the charging current.

The detecting of the zero cross-point includes receiving the detection voltage and sensing a time point at which the detection voltage reaches zero voltage.

The detecting of the zero cross-point includes generating a zero voltage detection signal having a first level when the detection voltage is higher than zero voltage and a second level when the detection voltage is lower than zero voltage.

The generating of the reference signal includes sensing a rising edge or a falling edge of the zero voltage detection signal as the zero cross-point and determining a period between two adjacent rising edges or two adjacent falling edges as one cycle of the input voltage.

The generating of the reference signal includes: generating a reference clock signal that controls an increase or decrease time point of the reference signal during one cycle of the input voltage, determined according to the determined zero cross-point, and generating a digital signal increased according to the reference clock signal during the one cycle and then decreased; and generating the reference signal by converting the digital signal to an analog signal.

The reference clock signal includes a predetermined number of edges for the one cycle, and the generating of the digital signal increases the digital signal by being synchronized at a time point that the reference clock signal edge is generated during a period from a time point that the first edge of the reference clock signal is generated to the n-th edge of the reference clock signal among the one cycle, and decreases the digital signal by being synchronized at a time point that the reference clock signal edge is generated during a period from the (n+1)th edge to the predetermined number of edge.

The switch control method further includes controlling switching operation of the power switch by comparing a current flowing in the power switch and the reference signal.

Further, a power supply according to an exemplary embodiment of the present invention includes: a dimmer passing an AC input according to a predetermined dimmer angle; a power switch to which an input voltage generated by rectifying the AC input passed through the dimmer is transmitted; and a switch controller for controlling switching operation of the power switch.

The switch controller includes a current source generating a charging current using a voltage that depends on the input voltage, a reference signal generator detecting a zero cross-point at which the input voltage becomes zero voltage using a detection voltage output from the current source, and generating a reference signal synchronized at the detected cross-point, and a PWM controller controlling switching operation of the power switch by comparing a current flowing in the power switch with the reference signal.

The reference signal generator includes: a zero cross detection circuit receiving the detection voltage and sensing a time point at which the detection voltage reaches zero voltage; a digital sine wave generator generating a reference clock signal controlling an increase or decrease time point of the reference signal during one cycle of the input voltage, determined according to the sensed zero voltage reach time point and generating a digital signal increased and then decreased according to the reference clock signal during the one cycle; and a digital-to-analog converter generating the reference signal by converting the digital signal to an analog signal.

The zero cross detection circuit generates a zero voltage detection signal having a first level when the detection voltage is higher than zero voltage and a second level when the detection voltage is lower than zero voltage, and the digital sine wave generator senses a rising edge or a falling edge of the zero voltage detection signal as the zero cross-point, and determines a period between two adjacent rising edges or two adjacent falling edges as one cycle of the input voltage.

According to the exemplary embodiments of the present invention, a reference signal synchronized with an input voltage is provided.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Figure 2:
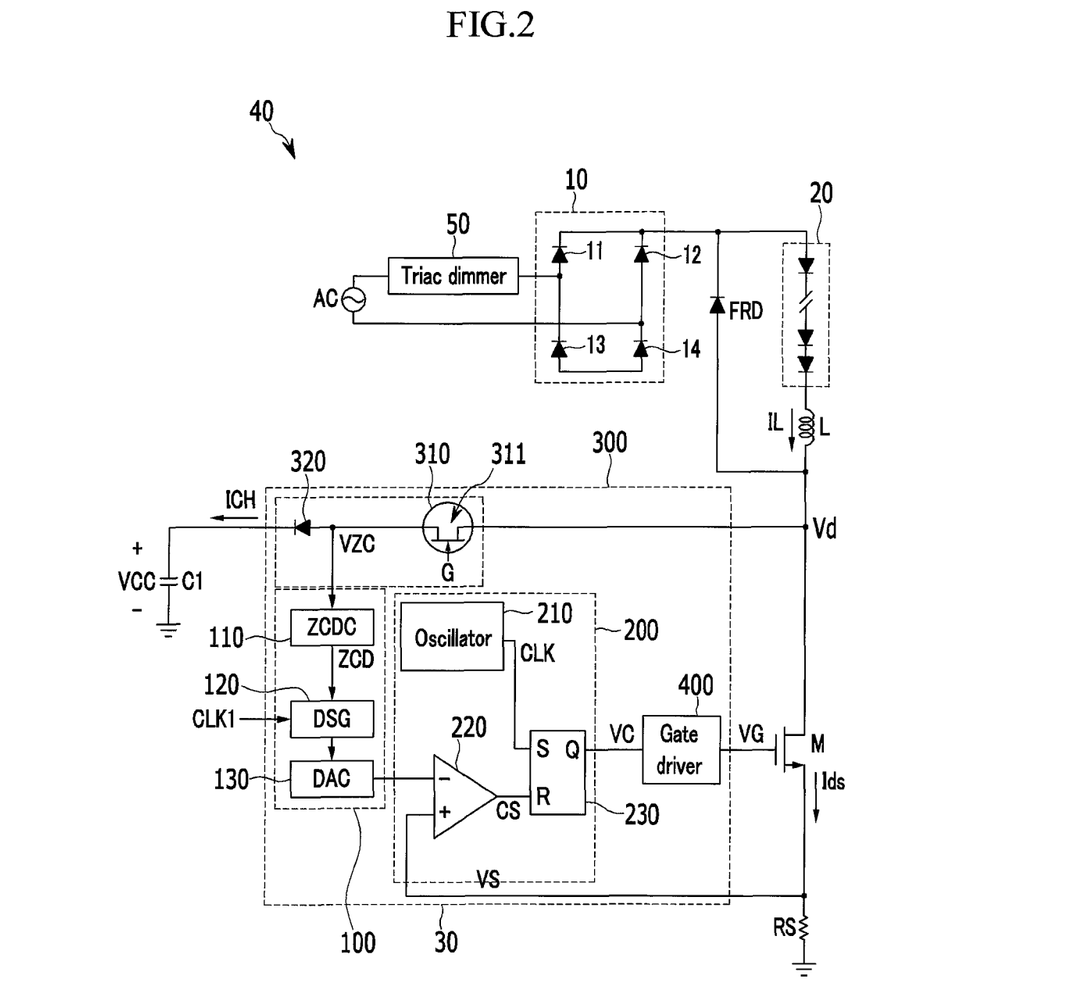
FIG. 2 shows a switch controller and a power supply including the switch controller according to an exemplary embodiment of the present invention.

FIG. 2 shows a switch controller and a power supply including the switch controller according to an exemplary embodiment of the present invention.

A power supply 40 according to the exemplary embodiment of the present invention is realized as a buck converter, but the present invention is not limited thereto. The power supply 40 according to the exemplary embodiment of the present invention is set to supply power to an LED string 20 formed of a plurality of LED elements coupled in series.

The power supply 40 includes a triac dimmer 50. The triac dimmer 50 is connected between an AC input and a rectifying circuit 10. The triac dimmer 50 allows a portion according to a set value to pass therethrough among one cycle of the AC input.

The triac dimmer 50 according to the exemplary embodiment of the present invention allows the AC input to pass as shown in AC_2 in FIG. 1. However, the present invention is not limited thereto, and AC_1 or other phases may pass the triac dimmer 50.

The rectifying circuit 10 according to the exemplary embodiment of the present invention is realized as a bridge diode, and supplies an input voltage Vin that is full-wave rectified from the AC input passed through the triac dimmer 50 to the LED string 20. The rectifying circuit 10 includes four rectifying diodes 11 to 14.

The power supply 40 further includes a power switch M, a diode FRD, an inductor L, and a switch controller 30. The switch controller 30 and the power switch M are respectively provided as chips and may form one package.

As shown in FIG. 2, the power switch M operates according to a gate signal VG transmitted from the switch controller 30. The power switch M is realized as an n-channel metal oxide semiconductor filed effect transistor (NMOSFET). However, the present invention is not limited thereto, and another type of transistor element may be applied as necessary.

A first end of the LED string 20 is connected to the rectifying circuit 10 and a second end of the LED string 20 is connected to a first end of the inductor L. The diode FRD is a fast recovery diode, and connected to a drain electrode of the power switch M and the first end of the LED string 20. The diode FRD forms a path through which a current flowing to the inductor L flows to the LED string 20 while the power switch M is in the turn-off state.

The drain electrode of the power switch M is connected to a second end of the inductor L, a source electrode thereof is connected to a first end of a sense resistor RS, and a gate electrode thereof is applied with the gate signal VG transmitted from the switch controller 30. The power switch M is switched by the gate signal VG.

When the power switch M is turned on, an inductor current IL increasing according to the input voltage Vin flows through the LED string 20 and the power switch M, and energy is stored in the inductor L by the inductor current IL. In this case, a current (hereinafter, referred to as a drain current Ids) flowing in the power switch M flows to the resistor RS such that a sense voltage VS is generated.

When the power switch M is turned off, the inductor current IL is decreased while the energy stored in the inductor L still remains during the turn-on period. In this case, the decreasing inductor current IL is supplied to the LED string 20 through the diode FRD.

A peak flow (envelop) of the drain voltage Vd according to the exemplary embodiment of the present invention has a phase and a frequency that are the same as those of the input voltage Vin. In further detail, the peak of the drain voltage Vd is generated during the turn-off period of the power switch M, and the drain voltage Vd follows the waveform of the input voltage Vin during the turn-off period. During the turn-on period of the power switch M, the drain voltage Vd is determined by the drain current Ids and the sense voltage RS, and therefore the drain voltage Vd is a low voltage.

The switch controller 30 generates a power source voltage VCC using the input end of the power switch M, that is, the drain voltage Vd of the power switch M in the present exemplary embodiment, and detects a zero cross-point of the input voltage Vin using the power source voltage VCC. However, the present invention is not limited thereto, and the input voltage Vin may be used instead of using the drain voltage Vd.

The switch controller 30 generates a reference signal REF synchronized with the input voltage Vin using the detected zero cross-point, and controls switching operation of the power switch M using the reference signal REF and the sense voltage VS.

The switch controller 30 includes a self power source voltage (VCC) biasing circuit (hereinafter, referred to as a SVBC) 300, a reference signal generator 100, a PWM controller 200, and a gate driver 400.

Hereinafter, constituent elements of the switch controller 30 will be described in further detail with reference to FIG. 2 and FIG. 3.

Figure 3:
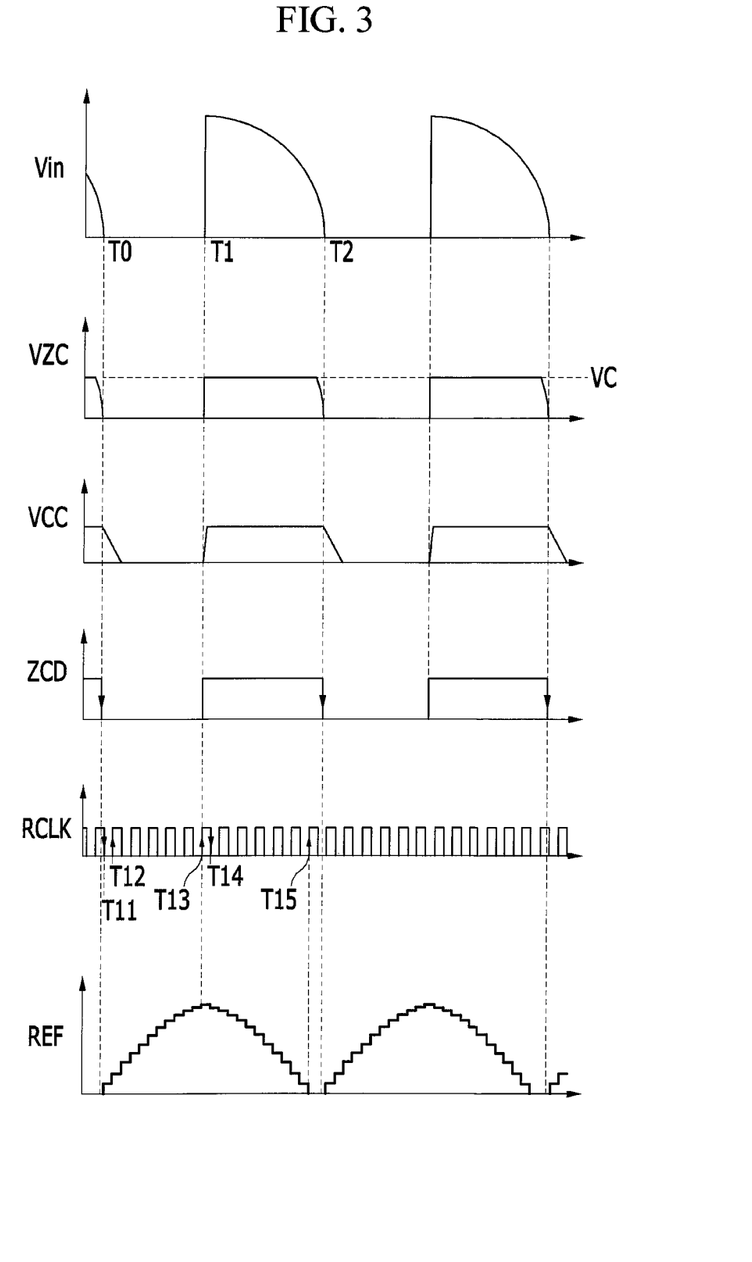
FIG. 3 is a waveform diagram of an input voltage, a power source voltage, a detection voltage, a zero cross detection signal, a reference clock signal, and a reference signal according to the exemplary embodiment of the present invention.

FIG. 3 is a waveform diagram of an input voltage, a power source voltage, a detection voltage, a zero cross-point signal, a reference clock signal, and a reference signal according to the exemplary embodiment of the present invention.

The SVBC 300 generates the power source voltage VCC using a charging current ICH that charges a capacitor C1 using the drain voltage Vd. The power source voltage VCC is a power source voltage for operation of the switch controller 30.

The SVBC 300 includes a current source 310 and a diode 320. The current source 310 generates the charging current ICH that depends on the drain voltage Vd. An anode of the diode 320 includes an anode connected with an output end of the current source 310 and a cathode connected to a first end of the capacitor C1.

The current source 310 includes a junction gate field-effect transistor (JFET) 311. A drain electrode of the JFET 311 is connected to the drain electrode of the power switch M and a source electrode of the JFET 311 is connected to an anode of the diode 320. A gate electrode of the JFET 311 is applied with a predetermined level of gate voltage G.

A voltage (hereinafter, referred to as a detection voltage) VZC output from the current source 310 according to the exemplary embodiment of the present invention is a voltage for zero voltage cross detection of the input voltage Vin, and is a voltage that the drain voltage Vd is transmitted through the JFET 311. Due to a characteristic of the JFET 311, the detection voltage VZC is clamped to a voltage lower than a predetermined voltage.

The detection voltage VZC is decreased along the input voltage Vin near the zero cross-point of the input voltage Vin (T0 of FIG. 3). According to the decrease of the input voltage Vin, the charging current ICH is decreased.

During a period from a time point T0 to a time point T1, no input voltage Vin exists, and therefore the charging current ICH is not generated. Then, the power source voltage VCC is decreased from the time point T0 and then becomes zero voltage.

The input voltage Vin is increased at the time point T1, and the current source 310 generates the charging current ICH according to the drain voltage Vd. The detection voltage VZC is rapidly increased at the time point T1, and then maintained in the clamping voltage VC after the time point T1.

The capacitor C1 is charged by the charging current ICH and thus the power source voltage is rapidly increased from the time point T1.

When the input voltage Vin reaches zero voltage at a time point T2, the operation performed at the time point T0 is repeated. In this case, a period T0 to T2 corresponds one cycle of the input voltage Vin.

The reference signal generator 100 detects a zero cross-point of the input voltage Vin and generates a reference signal REF synchronized with the input voltage Vin. The reference signal REF is transmitted to the PWM controller 200.

The reference signal generator 100 includes a zero cross detection circuit (ZCDC) 110, a digital sine wave generator (DSG) 120, and a digital-to-analog converter (DAC) 130.

The ZCDC 110 detects the zero cross-point using the detection voltage VZC, and generates a zero cross detection signal ZCD that indicates the detected zero cross-point.

For example, the ZCDC 110 generates a zero cross detection signal ZCD that having a high level when the detection voltage VZC is higher than zero voltage and has a low level when the detection voltage VZC is lower than zero voltage.

Then, as shown in FIG. 3, the zero cross detection signal ZCD becomes pulse signal having a falling edge at the zero cross-points T0 and T2 and a rising edge at a time point that the input voltage Vin is generated.

That is, the falling edge time point that the zero cross detection signal VCD according to the exemplary embodiment of the present invention becomes zero voltage is synchronized at a time point that the input voltage Vin becomes zero voltage. However, the present invention is not limited thereto, and a rising edge time point that the zero cross detection signal VCD is increased may be synchronized at a time point that the input voltage Vin becomes zero voltage. This will be described later.

The DSG 120 senses one cycle of the input voltage Vin using the zero cross detection signal ZCD, and generates a digital signal DS that is increased or decreased during one cycle of the input voltage Vin.

The DSG 120 sets a gap between sequential zero cross points as one cycle of the input voltage Vin using the zero cross detection signal ZCD. In addition, the DSG 120 generates a digital signal DS that increases during one cycle of the input voltage Vin and then decreases.

The DAC 130 converts the input digital signal DS to an analog voltage signal in real time to generate a reference signal REF and outputs the reference signal REF. Then, the reference signal REF that increases or decreases by being synchronized with the input voltage Vin is generated.

The DSG 120 generates a digital signal DS that increases or decreases by a reference number of times during one cycle of the input voltage. When the reference number is 12, the digital signal DS is increased 12 times and decreased 12 times.

The DSG 120 generates a reference clock signal RCLK to control an increase time point or a decrease time point of the digital signal DS. In further detail, the DSG 120 generates a reference clock signal RCLK having a frequency that can increase or decrease the digital signal DS by a reference number of times for one cycle of the input voltage Vin by dividing a predetermined clock signal CLK1.

The digital signal DS according to the exemplary embodiment of the present invention is an n-bit digital signal. The DSG 120 is synchronized with an edge of the reference clock signal RCLK to increase the digital signal DS by the reference number of times and then decrease the digital signal DS by the reference number of times. In this case, the DSG 120 synchronizes the digital signal DS with the edge of the reference clock signal RCLK and then transmits the synchronized signal to the DAC 130.

For example, the reference number of times is set to 12, and an increase and a decrease of the reference signal REF will be described accordingly.

First, the digital signal DS increased at a falling edge time point T11 of the reference clock signal RCLK is transmitted to the DAC 130, and the DAC 130 converts the transmitted signal to generate the reference signal REF.

Next, the digital signal DS increased at a rising edge time point T12 of the reference clock signal RCLK is transmitted to the DAC 130, and the DAC 130 converts the transmitted signal to generate the reference signal REF.

With such a method, the increase of the reference signal REF is continued until a time point T13 at which the reference number of edges, that is, 12 edges are generated.

Then, the digital signal DS starts to decrease from a falling edge time point T14 of the reference clock signal RCLK, and the DAC 130 converts the decreasing digital signal DS to generate the reference signal REF. The decrease of the digital signal DS is continued until a time point T15 at which the 12$^{th}$ edge is generated, and the reference signal REF is decreased.

The DSG 120 according to the exemplary embodiment of the present invention is synchronized with the rising edge and the falling edge of the reference clock signal RCLK to increase or decrease the digital signal DS, but the present invention is not limited thereto. The DSG 120 may increase or decrease the digital signal DS by being synchronized only at the rising edge or the falling edge of the reference clock signal RCLK.

Hereinafter, a case that a rising edge of the zero cross detection signal ZCD is synchronized at a time point that the input voltage Vin becomes zero voltage. When the triac dimmer angle is between 90 to 180 degrees as shown in AC_2 of FIG. 1, the rising edge of the zero cross detection signal ZCD is synchronized at a time that the input voltage Vin becomes zero voltage.

Figure 4:
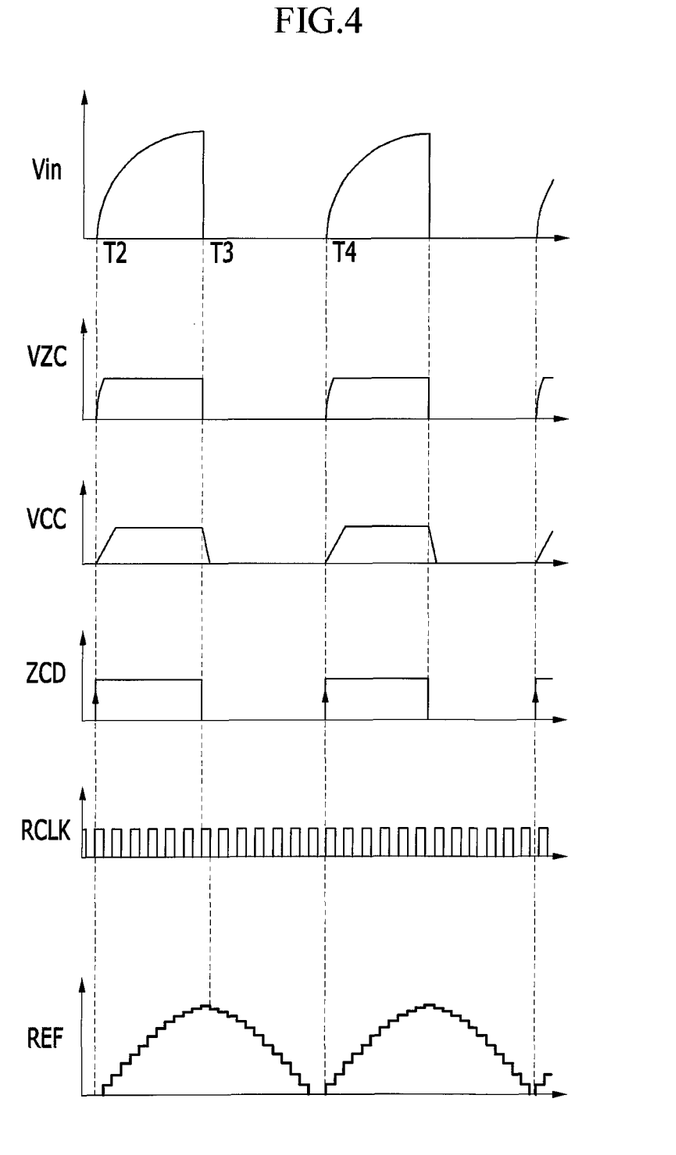
FIG. 4 is a waveform diagram of an input voltage, a power source voltage, a detection voltage, a zero cross detection signal, a reference clock signal, and a reference signal according to another exemplary embodiment of the present invention.

FIG. 4 shows a waveform diagram of an input voltage, a power source voltage, a detection voltage, a zero cross detection signal, a reference clock signal, and a reference signal according to another exemplary embodiment of the present invention.

As shown in FIG. 4, an input voltage Vin is generated and starts to increase at a time point T2. At the time point T2, a detection voltage VZC is generated and starts to increase.

Then, a charging current ICH is generated and starts to charge a capacitor C1 from the time point T2, and a power source voltage VCC starts to increase from the time point T2.

At a time point T3, the input voltage Vin is disappeared, and the detection voltage VZC is decreased to zero voltage. Since no charging current ICH is generated from the time point T3, the power source voltage VCC starts to decrease.

At a time point T4, the input voltage Vin is generated again and starts to increase. After that, waveforms of the input voltage Vin, the detection voltage VZC, and the power source voltage are repeated as in the period T2 to T3.

The reference signal generator according to the present exemplary embodiment of the present invention is the same as the reference signal generator 100 of the above-described exemplary embodiment, except that a zero voltage cross point of the input voltage Vin is sensed using a rising edge of a zero voltage detection signal ZCD.

Therefore, as shown in FIG. 4, a period (T3 to T4) between the time point T2 at which the zero cross detection signal ZCD is increased and a time point T4 is sensed as one cycle of the input voltage Vin.

In addition, during the sensed one cycle, a reference signal REF increased (or, decreased) by being synchronized with a rising edge and a falling edge of a reference clock signal RCLK is generated.

The generated reference signal has a full-wave rectification waveform synchronized with the input voltage Vin.

Referring back to FIG. 2, the PWM controller 200 includes a PWM comparator 220, an oscillator 210, an SR latch 230, and a gate driver 400.

The PWM comparator 220 includes a non-inversion terminal (+) to which a sense voltage VS is input and an inversion terminal (−) to which the reference signal REF is input. The PWM comparator 220 outputs a high-level comparison signal CS when a signal input to the non-inversion terminal (+) is higher than a signal input to the inversion (−) terminal. Otherwise, the PWM comparator 220 outputs a low-level comparison signal CS. The oscillator 210 generates a clock signal CLK that determines a switching frequency of a power switch M.

The SR latch 230 generates a gate control signal VC according to the clock signal CLK. The SR latch 230 includes a set terminal S to which the clock signal CLK is input, a reset terminal R to which the comparison signal CS is input, and an output terminal Q. The SR latch 230 outputs a high-level signal by being synchronized by a rising edge of the signal input to the set terminal S, and outputs a low-level signal by being synchronized by a rising edge of the signal input to the reset terminal R. Therefore, the SR latch 230 generates a high-level gate control signal VC by being synchronized by the rising edge of the clock signal CLK, and generates a low-level gate control signal by being synchronized by the rising edge of the comparison signal CS.

The gate driver 400 generates a gate signal VG that controls switching operation of a power switch according to the gate control signal VC. When the gate signal VG is high level, the power switch M is turned on, and when the gate signal VG is low level, the power switch M is turned off. The gate driver 400 generates a high-level gate signal VG according to a high-level gate control signal VC, and generates a low-level gate signal VG according to a low-level gate control signal VC.

As described, according to the exemplary embodiments of the present invention, a reference signal having a full-wave rectified waveform synchronized at a time point that the input voltage Vin becomes zero voltage is generated even though the input voltage Vin does not have a full-wave rectified waveform due to a triac dimmer. According to the generated reference signal, the switching operation of the power switch is controlled and a current flowing to a load is controlled.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| power supply 40 | triac dimmer 50 |
| rectifying circuit 10 | rectifying diode 11-14 |
| power switch M | diode FRD |
| Inductor L | switch controller 30 |
| SVBC 300 | |
| reference signal generator 100 | PWM controller 200 |
| gate driver 400 | current source 310 |
| diode 320 | zero cross detection circuit (ZCDC) 110 |
| digital sine wave generator (DSG) 120 | |
| digital-to-analog converter (DAC) 130 | |
| PWM comparator 220 | oscillator 210 |
| SR latch 230 | gate driver 400 |
| JFET 311 | |

What is claimed is:

1. An apparatus controlling switching operation of a power switch to which an input voltage rectified from an AC input passed through a dimmer is transmitted, comprising:
   a current source generating a charging current using a voltage that depends on the input voltage; and
   a reference signal generator generating a zero voltage detection signal based on a result of comparing a detection voltage output from the current source with zero voltage, detecting a zero cross-point at which the input voltage becomes zero voltage based on a rising edge or a falling edge of the zero voltage detection signal, and generating a reference signal synchronized at the detected zero cross-point.

2. The switch controller of claim 1, wherein an input terminal voltage of the power switch depends on the input voltage, and the current source generates a charging current that depends on the input terminal voltage of the power switch.

3. The switch controller of claim 2, wherein the current source comprises a JFET, and the detection voltage is a voltage that is the input terminal voltage of the power switch, passed through the JFET.

4. The switch controller of claim 1, wherein the reference signal generator comprises:
   a zero cross detection circuit receiving the detection voltage and sensing a time point that the detection voltage reaches zero voltage;
   a digital sine wave generator generating a reference clock signal controlling an increase or decrease time point of the reference signal during one cycle of the input voltage, determined according to the sensed zero voltage reach time point and generating a digital signal that is increased and then decreased according to the reference clock signal during the one cycle; and
   a digital-to-analog converter generating the reference signal by converting the digital signal to an analog signal.

5. The switch controller of claim 4, wherein the reference clock signal comprises a predetermined number of edges during the one cycle, and
   the digital sine wave generator increases the digital signal by being synchronized at a time point that the reference clock signal edge is generated during a period from a time point that a first edge of the reference clock signal is generated to an n-th edge of the reference clock signal among the one cycle, and decreases the digital signal by being synchronized at a time point that the reference clock signal edge is generated during a period from an (n+1)th edge to the predetermined number of edges.

6. The switch controller of claim 4, wherein the zero cross detection circuit generates the zero voltage detection signal having a first level when the detection voltage is higher than zero voltage and a second level when the detection voltage is lower than zero voltage.

7. The switch controller of claim 6, wherein the digital sine wave generator senses the rising edge or the falling edge of the zero voltage detection signal as the zero cross-point, and determines a period between two adjacent rising edges or two adjacent falling edges as one cycle of the input voltage.

8. The switch controller of claim 1, further comprising a PWM controller controlling switching operation of the power switch by comparing a current flowing in the power switch and the reference signal.

9. A switch control method for controlling switching operation of a power switch to which an input voltage rectified from an AC input passed through a dimmer is transmitted, comprising:
   generating a charging current using a voltage that depends on the input voltage;
   generating a voltage that depends on the input voltage as a detection voltage according to the generation of the charging current;
   generating a zero voltage detection signal based on a result of comparing the detection voltage with zero voltage;
   detecting a zero cross-point at which the input voltage becomes zero voltage based on a rising edge or a falling edge of the zero voltage detection signal; and
   generating a reference signal that is synchronized at the detected zero cross-point.

10. The switch control method of claim 9, wherein the voltage that depends on the input voltage is an input terminal voltage of the power switch, and the generating of the charging current comprises generating a charging current that depends on the input terminal voltage of the power switch.

11. The switch control method of claim 9, wherein the generating of the voltage that depends on the input voltage as the detection voltage according to the generation of the charging current comprises a step that the voltage that depends on the input voltage passes through a JFET for generation of the charging current.

12. The switch control method of claim 9, wherein the detecting of the zero cross-point comprises receiving the detection voltage and sensing a time point at which the detection voltage reaches zero voltage.

13. The switch control method of claim 9, wherein the generating the zero voltage detection signal comprises generating the zero voltage detection signal having a first level when the detection voltage is higher than zero voltage and a second level when the detection voltage is lower than zero voltage.

14. The switch control method of claim 13, wherein the generating the reference signal comprises:
 sensing the rising edge or the falling edge of the zero voltage detection signal as the zero cross-point, and
 determining a period between two adjacent rising edges or two adjacent falling edges as one cycle of the input voltage.

15. The switch control method of claim 9, wherein the generating the reference signal comprises:
 generating a reference clock signal that controls an increase or decrease time point of the reference signal during one cycle of the input voltage, determined according to the determined zero cross-point, and generating a digital signal that is increased according to the reference clock signal during the one cycle and then decreased; and
 generating the reference signal by converting the digital signal to an analog signal.

16. The switch control method of claim 15, wherein the reference clock signal comprises a predetermined number of edges for the one cycle, and
 the generating of the digital signal increases the digital signal by being synchronized at a time point that the reference clock signal edge is generated during a period from a time point that a first edge of the reference clock signal is generated to an n-th edge of the reference clock signal among the one cycle, and decreases the digital signal by being synchronized at a time point that the reference clock signal edge is generated during a period from an (n+1)th edge to the predetermined number of edges.

17. The switch control method of claim 9, further comprising controlling switching operation of the power switch by comparing a current flowing in the power switch and the reference signal.

18. A power supply comprising:
 a dimmer passing an AC input according to a predetermined dimmer angle;
 a power switch to which an input voltage generated by rectifying the AC input passed through the dimmer is transmitted; and
 a switch controller for controlling switching operation of the power switch, wherein the switch controller comprises,
 a current source generating a charging current using a voltage that depends on the input voltage,
 a reference signal generator detecting a zero voltage detection signal based on a result of comparing a detection voltage output from the current source with zero voltage, detecting a zero cross-point at which the input voltage becomes zero voltage based on a rising edge or a falling edge of the zero voltage detection signal, and generating a reference signal synchronized at the detected cross-point, and
 a PWM controller controlling the switching operation of the power switch by comparing a current flowing in the power switch with the reference signal.

19. The power supply of claim 18, wherein the reference signal generator comprises:
 a zero cross detection circuit receiving the detection voltage and sensing a time point at which the detection voltage reaches zero voltage;
 a digital sine wave generator generating a reference clock signal controlling an increase or decrease time point of the reference signal during one cycle of the input voltage, determined according to the sensed zero voltage reach time point and generating a digital signal that is increased and then decreased according to the reference clock signal during the one cycle; and
 a digital-to-analog converter generating the reference signal by converting the digital signal to an analog signal.

20. The power supply of claim 19, wherein the zero cross detection circuit generates the zero voltage detection signal having a first level when the detection voltage is higher than zero voltage and a second level when the detection voltage is lower than zero voltage, and
 the digital sine wave generator senses the rising edge or the falling edge of the zero voltage detection signal as the zero cross-point, and determines a period between two adjacent rising edges or two adjacent falling edges as one cycle of the input voltage.

* * * * *